United States Patent [19]

Boyd

[11] 3,753,496
[45] Aug. 21, 1973

[54] CONVERGING VORTEX APPARATUS FOR SEPARATING OIL FROM WATER

[76] Inventor: Edward A. Boyd, San Diego, Calif.

[22] Filed: Dec. 20, 1971

[21] Appl. No.: 209,835

[52] U.S. Cl............ 210/242, 210/DIG. 21, 210/304
[51] Int. Cl............................................. E02b 15/04
[58] Field of Search........................ 210/83, 84, 242, 210/DIG. 21, 169, 304

[56] References Cited
UNITED STATES PATENTS

| | | | |
|---|---|---|---|
| 3,628,664 | 12/1971 | Stanwood | 210/169 |
| 3,635,342 | 1/1972 | Mourlon | 210/84 |
| 3,534,859 | 10/1970 | Amero et al. | 210/242 |
| 3,169,920 | 2/1965 | Payne | 210/169 |
| 2,891,672 | 6/1959 | Veld et al. | 210/242 |
| 1,644,248 | 10/1927 | Goldman | 210/242 |

Primary Examiner—Samih N. Zaharna
Assistant Examiner—T. A. Granger
Attorney—R. S. Sciascia et al.

[57] ABSTRACT

A vortex generator in the form of a funnel-shaped casing is submerged with its upper edge or lip portion in close proximity to an oil slick. A plurality of vanes carried by the casing induce a rotary motion in fluids passing through the casing. A suction pump creates the flow by drawing a mixture of water and oil through the casing, the mixture then being carried by a conduit to a nearby tank or reservoir where it can be separated.

5 Claims, 6 Drawing Figures

PATENTED AUG 21 1973

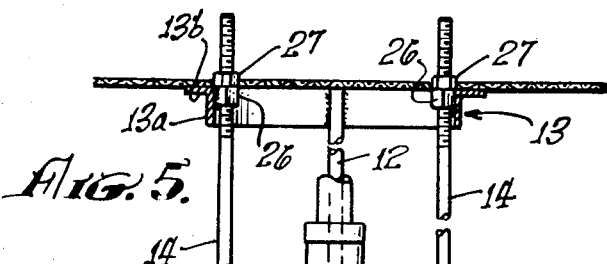
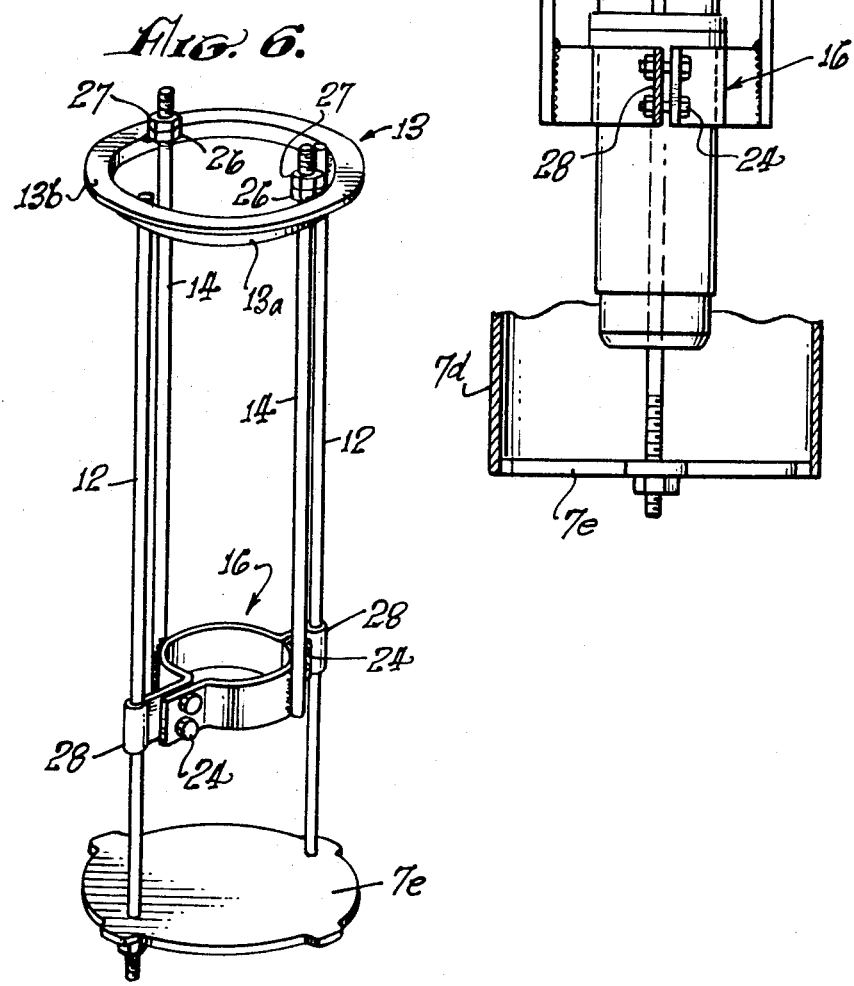

CONVERGING VORTEX APPARATUS FOR SEPARATING OIL FROM WATER

The invention described herein may be manufactured and used by or for the Government of the United State of America for governmental purposes without the payment of any royalties thereon or therefor.

BACKGROUND OF THE INVENTION

1. Field of the Invention

The present invention relates to mechanical methods and means for cleaning up oil slicks.

2. Description of the Prior Art

Oil slicks produced by spills, offshore drilling operations, tanker accidents and the like present a constant and very difficult problem which lately has received a great deal of attention by both private industry and governmental agencies. Some of the efforts directed to this problem involve the use of chemicals even though the use of some of these chemicals is not authorized for ecological reasons. Other efforts include the use of mechanical devices, such as the absorption of the oil by straw and other fiber filaments, vacuuming, cleaning or the sinking of the oil by sand. Rotating belts and weirs also have been suggested, although these systems have rather serious deficiencies such, for example, as their relatively low rate of flow and their relative inefficiency due to a low ratio of oil to the water in the portion of the water that is being cleansed. Obviously, any system which takes in copious amounts of water to remove relatively small amounts of oil is inefficient and unnecessarily expensive. Another difficulty with prior art devices is their complexity and use of various moving parts that require frequent maintenance for effective operation.

OBJECTS OF THE INVENTION

It is therefore among the objects of the present invention to provide an oil separation system that is highly efficient, simple, inexpensive, easily maintained and easily moved from one location to another for immediate use without elaborate preparatory operations.

Another object is to provide apparatus for separating oil from water using virtually no moving parts so as to significantly reduce operating and maintenance expense, the economy being due in part to the fact its operation requires a minimum of manpower.

A further object is to provide an effective and efficient oil separation apparatus capable of use in large unconfined spills as well as small spills or leaks in confined spaces such as ship cargo tanks and the like.

Still another object is to provide self-contained units to collect oil samples from water surfaces for analysis and source determination. These and other objects will become apparent in the ensuing description.

SUMMARY OF THE INVENTION

Broadly considered, the apparatus includes a vortex generator having means to induce a rotary motion in fluids flowing through the generator. In operation, the generator is supported in a substantially submerged disposition with its upper end near the water surface in close proximity to the oil slick. A pump or the like is disposed directly beneath this upper end to apply a suction force to the water in the generator, this force most suitably being applied axially of the path of the induced rotary flow. Effluent means are employed to carry off the mixture of oil and water drain through the pump of suction means and this effluent means most suitably is a conduit to carry the pump discharge to a remote reservoir where the oil can be separated. As will be appreciated, when suction is applied by the pump or other means a portion of the water in the generator is drawn out through the conduit thereby lowering the water level in the generator and producing a flow which the generator translates into a rotary or vortical flow.

BRIEF DESCRIPTION OF THE DRAWINGS

The invention is illustrated in the accompanying drawings of which:

FIGS. 5 and 6 are elevational and perspective views respectively showing in enlarged form a particular pump mounting arrangement.

DETAILED DESCRIPTION OF THE ILLUSTRATED EMBODIMENTS

Figure 1:
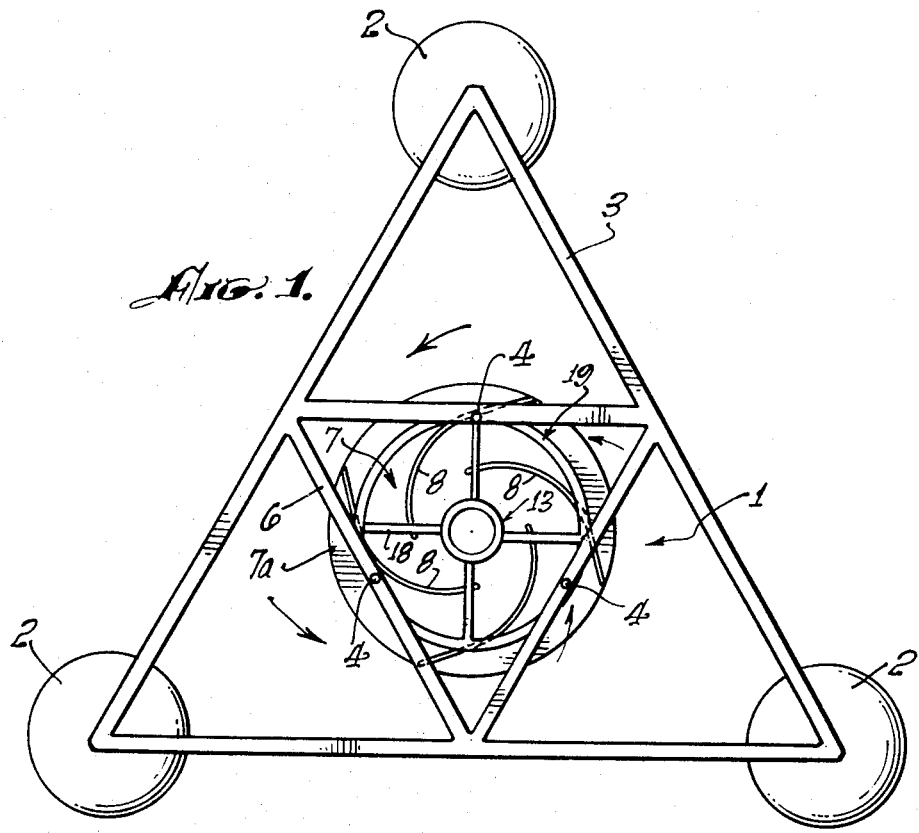
FIG. 1 is a somewhat diagrammatic plan or top view of the present apparatus showing a particular type of float support.
Figure 2:
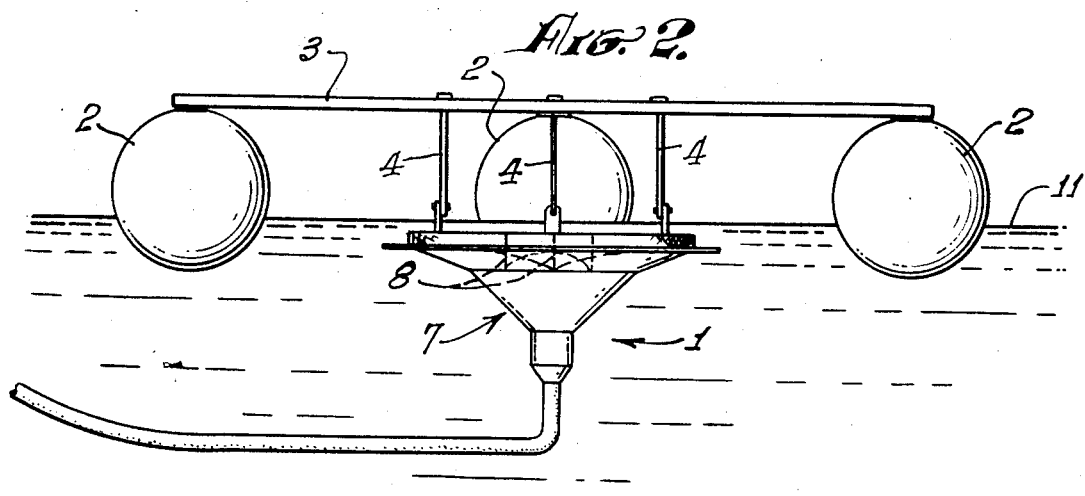
FIG. 2 is another schematic view showing the apparatus of FIG. 1 in side elevation.

Referring to FIGS. 1 and 2, the oil skimmer of the present invention, generally designated by numeral 1, is illustrated in an operative disposition in which it is supported by a triangular arrangement of spherical floats or buoys 2 rigidly secured one to the other by a triangular frame 3. The skinner itself is dependently carried by rod supports 4 secured at their upper ends to an inner triangular frame 6.

Skimmer 1 generally includes a funnel-shaped casing 7, arcuate vanes 8 and suction means, such as a suction line 9 (FIG. 2) which communicates with a ship-mounted pump (not shown) functioning to draw a mixture of sea water and oil through the funnel-shaped casing and deposit it in a suitable tank or reservoir also provided aboard the support ship, boat or barge as the case may be. As will be described, the suction means preferably is in the form of a pump carried by the casing.

The float arrangement shown in FIGS. 1 and 2 is used to assure that the apparatus is maintained in a stable operating position with the horizontal plane of its vanes essentially parallel to the surface of the water or, as shown in FIG. 2, parallel to water line 11. Also, the floats preferably are spaced a sufficient distance from the casing to permit a free, undisturbed flow of water and oil. As should be apparent, means other than the float means of FIGS. 1 and 2 can be employed to support the skimmer in its operative position. Thus, when the skimmer is being used in conjunction with a support ship or barge, the casing can be suspended by suitable lines from a ship mounted boom or the like. In this latter instance, an operator aboard ship manually manipulates a hoist line to maintain the casing at the desired level relative to water line 11.

Figure 3:
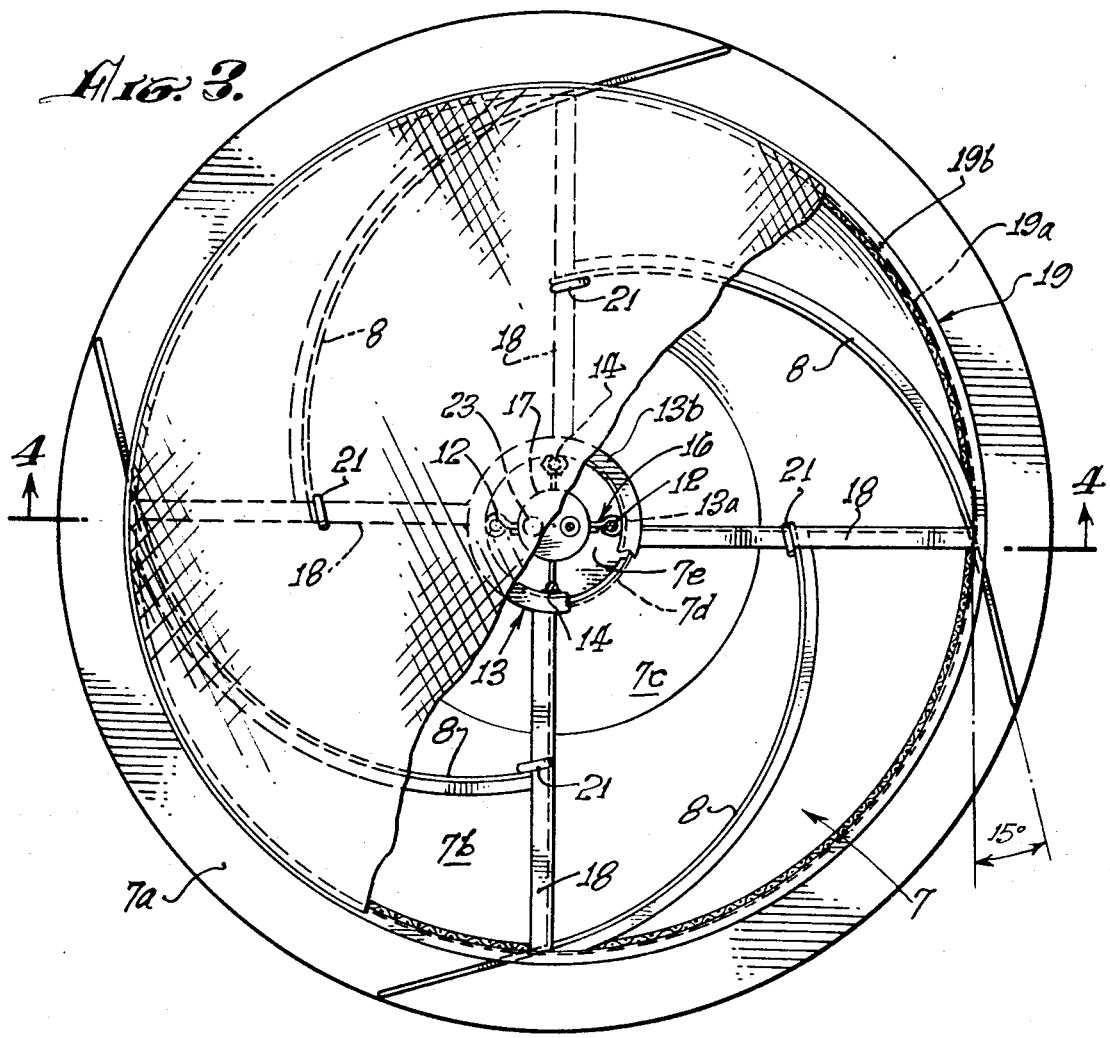
FIG. 3 is an enlarged plan view of the FIG. 1 apparatus, the view being partially broken away to show certain underlying structural details.
Figure 4:
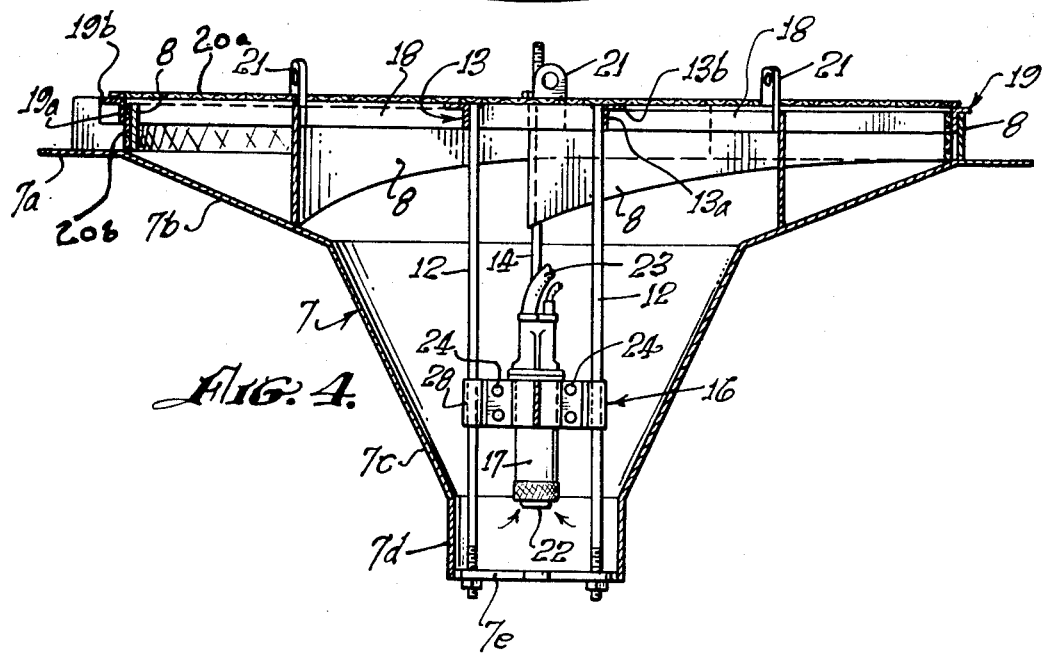
FIG. 4 is a sectional view of the apparatus taken along lines 4—4 of FIG. 3.

The casing and vane structure as schematically illustrated in FIGS. 1 and 2 is shown in greater detail in FIGS. 3 and 4. Referring first to FIG. 4, it will be seen that the casing 7 is formed of several sections including a horizontal circular lip section 7a, two inwardly converging sections 7b and 7c, a base or collar section 7d and a base plate 7e. Section 7a provides a skimming lip portion which, as shown in FIG. 2 is adapted to be disposed at or close to water line when the casing is supported in operative disposition. Section 7b provides what can be called a 'vortex cone' portion of the casing while section 7c provides a 'sump cone' portion. Most suitably, these sections, as well as other components of the skimmer are formed of a non-corrosive metal although, as will be appreciated, other structural materials can be substituted providing they have sufficient strength and resistance to withstand the sea environment in which they are intended to be placed.

To provide a rigid, unitary structure, a pair of base plate support rods 12 are bolted as shown to base plate 7e and the upper ends of rods 12 welded or otherwise rigidly secured to a ring-shaped collar member 13 which, as seen, is an angle piece having a vertical flange 13a secured to the rods and a horizontal flange 13b. Another pair of rods known as pump guide rods 14 also are rigidly secured to collar 13 in a manner similar to the coupling of rods 12. However, the lower ends of rods 14, instead of being bolted to base plate 7e, are secured to a special ring-shaped pump clamp 16 which, in a manner to be described, supports a submersible pump 17.

Flange 13a of collar 13 also supports a spoke-like arrangement that includes four braces 18 the outer ends of which are rigidly secured to another large ring-shaped collar 19 which again is formed with a vertical flange 19a and a horizontal flange 19b.

Four radial vanes 8 are provided to produce a rotational movement in the water and oil which, as will be understood, is drawn into the casing by the operation of pump 17. Also, these vanes provide additional rigidity to the structure by extending as brace members between spoke-line braces 18 and section 7b of the casing. More specifically, it will be noted that each vane is an arcuate member having a relatively wide inner end, a horizontal upper surface and an outwardly tapering lower surface. The inner surface 8a, as best shown in FIG. 4, is rigidly secured at its upper end to one of the spoke-like braces 18, while the lower end portion of this inner surface is coupled to section 7b of the casing. The major portion of each of these vanes extends acurately through each of the quadrants defined by braces 18 and the form of the braces extending through this quadrant preferably is angular having conventional horizontal and vertical angle flanges. The outer portion of the vanes however extends as a single plate across lip portion 7a as shown in the drawings. The narrow outer ends of the vanes also act as bracing members since they are secured at their upper end to large collar 19 and at their lower end to lip portion 7a of the casings.

Screens 20 and 20a are provided to filter the water and oil mixture as it is drawn into the casing. Screen 20 is a flat member extending horizontally over the open top of the casing. preferably, it is secured in place by a welded attachment to the vanes and to flange 19b of collar 19. Screen 20 is ring shaped and is secured at its upper end to flange 19a and at its lower end to lip 7a. Both screens may be formed of ¼-inch expanded metal to screen-out larger foreign objects which might damage the pump or affect its operation.

Generally considered, an oil skimmer formed in the foregoing manner provides a strong, rigid, unitized structure which can be supported in the operative position shown in FIG. 2 either by a boom line or by the special triangular float arrangement. Special ear-like brackets 21 are rigidly secured to spoke-like braces 18 and approximately at the midpoint of these braces, these brackets providing the casing support members to which the hoist line or the connecting rods of FIG. 2 can be coupled.

Pump 17, as already indicated should be a submersible-type pump and, in practice, an 11–B–11A Sawyer submersible pump has been successfully employed. As indicated by the arrows of FIG. 4, water is drawn into the pump through an inlet end 22 and it is pumped out through an effluent conduit 23 that leads to a suitable reservoir provided aboard a supporting barge or ship. In actual practice, a U.S. Navy LCM has been outfitted as a support vessel for the present skimmer, and LCM being provided with 9,000 gallon tanks to receive the effluent from two vortex skimmers such as the skinners already described. In addition, the vessel can be equipped with two Dehaval diesel oil purifiers which can be used to separate the oil-water mixture collected by the skimmer returning the clean water and retaining the oil products. When so used, the present skimmer not only functions to clean the polluted waters but also to provide a suitable device for reclamation of oil products.

As shown in FIGS. 4, 5 and 6, pump 17 is adjustably supported in the casing by a special clamp 16, which, in turn, is supported by rods 12 and 14. As perhaps best seen in FIGS. 5 and 6, clamp 16 is a C-type clamp the open ends of which are drawn tightly into clamping disposition about pump 17 by bolts 24. Rods 14 have their lower ends welded or otherwise rigidly secured to clamping ring 16 at diametrically opposite locations on the ring. The upper ends of rods 14 are threadably received by bolts 26, which in turn, are rigidly secured to inner collar 13 of the casing. Thus, the vertical position of the clamp and therefore the pump is adjustable through this threaded engagement of rods 14. Lock nuts 27 maintain the adjusted position of the clamp. Also, as best shown in FIG. 6, the vertical adjustment of clamp 16 is permitted because of its slidable engagement with support rods 12 which, as already stated, are rigidly secured at top and bottom to collar 13 and base plate 7a respectively. For this purpose, clamp 17 is formed with radially projecting flanges 28 formed at their outer ends to loosely encircle rods 12 to permit the clamp to slide upwardly or downwardly on these rods.

Assuming that the skimmer is to be used to clean up an oil slick formed on a body of water such as harbor water and further assuming that the skimmer is to be supported by a suitable boom provided by a support vessel, the boom supporting lines first are secured to ears 21 and operator aboard ship then lowers the skimmer into a particular position relative to the surface of the water. For example, referring to FIG. 2, the skimmer can be lowered to a point at which its upper surfaces are either precisely on water line 11 or slightly below it. In this position it will be noted that lip portion 7a of the casing is completely submerged. Pump 17 then is energized to draw a mixture of water and oil into the casing and this mixture travels through what has been called the 'vortex cone' of the casing formed by casing section 7b into the 'sump cone' section of the casing which is formed by casing section 7c. As the incoming mixture passes through the 'vortex cone' it is directed by the vanes 8 into a swirling or rotary motion to create what has been referred to as a vortex or a vortical flow pattern. Pump 17 receives the flow from the sump section of the casing and forcefully transmits this flow through its effluent conduit 17 to the ship reservoir. As the water and oil mixture is forcefully removed from the interior of the casing, the casing itself becomes more buoyant and rises a slight distance. In this operating position, lip portion 7a is closer to water line 11 and, most suitably, this lip portion is precisely at the lower level of the oil film which is to be cleaned. Obviously, the operating and non-operating positions of the casing can be varied in accordance with the thickness of the oil film or in any other manner which may be deemed best for the particular cleaning operating being conducted. It will be the function of the boom operator aboard the support ship to maintain the operating position of the skimmer at its desired level. If desired, base plate 7e of the casing can be provided with slot openings to permit some flow through this base plate. In this regard, it will be understood that the vertical flow of the oil and water mixture through the casing and into effluent conduit 23 should be a constant velocity flow so as to maintain to as great degree as possible the desired rotational movement of the incoming fluids which, in turn, causes the vortex within the skimmer casing. Other pumping arrangements can be employed to increase the efficiency of the skimming operation.

One particular advantage of the present skimmer is that it is capable of operating at a high rate of flow with an efficient ratio of oil to water, In this regard, other mechanical oil-cleaning mechanisms, such as the rotating belts or weirs, are not as efficient due to the fact that they must handle copious amounts of water in order to remove relatively small amounts of oil. As stated, the ratio of oil to water with the present skimmer can be quite high, and this ratio increases with the depth of the oil film or layer. Another particular advantage of the present apparatus is that it has no moving parts except for the pump and therefore requires a minimum of maintenance. Further, it easily can be transported from one location to another and put into operation quickly so as to permit immediate action under emergency conditions. Coupled with these advantages is the additional fact that the structural design of the apparatus is quite simple and its fabrication relatively inexpensive so as to permit extensive use of a plural number of skimmers each feeding into a single reservoir. As stated, the present skimmer can be used for a variety of applications such as the removal of small spills in confined spaces. Spills of this type frequently result from oil leaks internal to ships cargo tanks. If desired the skimmer can also be used to remove an oil film formed on ballast water or, in specific applications, to collect oil samples for analysis and source determination. Of course, the major objective of any such apparatus is to permit the removal of larger oil spills from open sea waters as will be appreciated, the present apparatus is well suited for this purpose. In this regard, its size can be varied in accordance with the intended use although, as indicated, the apparatus is relatively inexpensive so as to permit the use of whatever number of individual skimmers may be needed for any single situation.

Obviously many modifications and variations of the present invention are possible in the light of the above teachings. It is therefore to be understood that within the scope of the appended claims the invention may be practiced other than as specifically described.

I claim:

1. Apparatus for skimming oil films and other water-borne fluids from water surfaces comprising:

a vortex generator suspension means supporting said generator in a substantially submerged disposition with its upper end near to and substantially parallel with said water surface, said generator being formed as a downwardly tapering funnel with its upper end open and of enlarged diameter throughout its circumference to admit the surrounding fluids and a lower end of reduced diameter throughout its circumference provided with an outlet opening, said upper end being formed with radially spaced inner and outer circumferentially arranged structural members and with a plurality of spoke-like braces connected therebetween and rigidly supporting said structural members and dividing said upper end of enlarged diameter into a plurality of sections arranged between said outer circumferentially arranged structural member and said inner circumferentially arranged structural member, a plurality of vanes carried by the generator and extending radially in a spiral direction across said upper end for inducing a rotary motion in fluids as said fluids flow into said upper end, the rotary motion having the axis of the funnel as its axis of rotation, each of said vanes being a horizontal member supported by said spoke-like braces and with a first end portion extending from a portion of one of said spoke-like braces near said inner circumferentially arranged structural member, the length of each horizontal member extending arcuately through at least one of said plurality of sections, and with a second end portion connected to said outer circumferentially arranged structural member, suction means for drawing fluids through said outlet opening, said opening having its axis disposed substantially in alignment with said axis of rotation whereby said suction force evacuates fluids from the generator axially of said vortical flow, and conduit means for transporting evacuated fluids to a remote location, said generator funneling said fluids into said outlet opening and said suction means being adapted to constantly draw funnelled fluids from the lower end of the generator whereupon additional fluids are drawn into said upper end.

2. The apparatus of claim 1 wherein said suction means is a driven submersible suction pump carried by said generator.

3. The apparatus of claim 1 wherein said suspension means includes:

a plurality of radially-spaced floats, and extension boom means supportably connecting said generator to said floats for spacing said floats away from the rotary flow induced by the generator.

4. The apparatus of claim 3 wherein said suspension means is adjustable for varying the submerged disposition of the generator.

5. The apparatus of claim 1 further including filtering means covering said upper end for preventing solid objects present in fluids from entering said generator.

* * * * *